(12) United States Patent
Robertson

(10) Patent No.: US 7,934,619 B1
(45) Date of Patent: May 3, 2011

(54) CABLE SUPPORTED MULTI-CHAMBER WASTE WATER TANK

(75) Inventor: Darrel Robertson, Grove, OK (US)

(73) Assignee: All State Tank Manufacturing, LLC, Grove, OK (US)

( * ) Notice: Subject to any disclaimer, the term of this patent is extended or adjusted under 35 U.S.C. 154(b) by 465 days.

(21) Appl. No.: 12/207,113

(22) Filed: Sep. 9, 2008

(51) Int. Cl.
*B65D 90/12* (2006.01)

(52) U.S. Cl. ............... 220/651; 220/652; 220/653

(58) Field of Classification Search ........... 220/651–653
See application file for complete search history.

(56) References Cited

U.S. PATENT DOCUMENTS

| | | |
|---|---|---|
| 730,344 A | 6/1903 | Clayton, Sr. |
| 1,738,483 A | 12/1929 | Raymond |
| 2,094,589 A | 10/1937 | Day |
| 2,156,400 A | 5/1939 | Pechstein |
| 2,333,792 A | 11/1943 | Jackson |
| 2,431,693 A | 12/1947 | Horton |
| 2,433,335 A | 12/1947 | Boardman |
| 2,532,854 A | 12/1950 | Plummer |
| 2,533,041 A | 12/1950 | Plummer |
| 2,540,312 A | 2/1951 | Allen |
| 2,812,574 A | 11/1957 | Wiggins |
| 3,362,538 A | 1/1968 | Katz et al. |
| 3,382,625 A | 5/1968 | Kuss |
| 3,409,161 A | 11/1968 | Arne |
| 3,774,768 A * | 11/1973 | Turner ............... 210/199 |
| 3,854,225 A * | 12/1974 | Wyener ............... 434/126 |
| 4,003,337 A * | 1/1977 | Moore ............... 119/224 |
| 4,331,252 A | 5/1982 | Carren et al. |
| 5,119,959 A * | 6/1992 | Bogdan ............... 220/585 |
| 5,222,618 A * | 6/1993 | Koch ............... 220/1.5 |
| 5,431,827 A * | 7/1995 | Tatch ............... 210/767 |
| 5,944,995 A | 8/1999 | Sethi et al. |
| 2005/0131749 A1* | 6/2005 | Watson et al. ............... 705/8 |
| 2007/0272692 A1 | 11/2007 | Hiner |

FOREIGN PATENT DOCUMENTS

| | | |
|---|---|---|
| EP | 1033328 | 6/2000 |
| JP | 4253680 | 9/1992 |

* cited by examiner

*Primary Examiner* — Chester T Barry
(74) *Attorney, Agent, or Firm* — Head, Johnson & Kachigian, P.C.

(57) ABSTRACT

A waste water tank having an inner tank with an inner tank wall; a concentric outer tank with an outer tank wall; a plurality of inner walls extending from the outer tank wall to the inner tank wall, such that the plurality of inner walls divides the outer tank into a plurality of chambers; and a plurality of cables attached to and extending between adjacent pairs of the inner walls, such that the cables provide support to the inner walls when the chamber defined by the inner walls, the inner tank wall, and the outer tank wall is full of fluid and adjacent chambers are empty.

24 Claims, 5 Drawing Sheets

US 7,934,619 B1

CABLE SUPPORTED MULTI-CHAMBER WASTE WATER TANK

FIELD OF THE INVENTION

This invention relates generally to waste water tanks, and more particularly to a waste water tank with multiple chambers where the integrity of the chamber walls is supported with cables.

DESCRIPTION OF THE RELATED ART

In well-known waste water treatment processes, waste water is transferred through a series of chambers where the waste water becomes progressively treated. A primary mechanism for treating the waste water is aerating the waste water with insertion of atmospheric air at the base of the chambers and allowing it to aerate upward. For example, sewage may be treated in this manner.

A number of discreet chambers may be utilized in this process. Alternately, in one well-known configuration, an open-top outer cylinder surrounds a concentric open-top inner cylinder. The outer cylinder is segmented into a number of chambers with radially extending dividing inner walls.

During use, one or more chambers are filled with fluid while one or more other chambers could be empty or nearly empty. Accordingly, the inner walls are alternately subject to pressure from the fluid in the chambers.

The waste water tanks may be fabricated from metal or other material. In the past, in order to provide required strength, the walls of the device had to be extremely thick. Alternately, internal metal bracing could be utilized. Clayton, Sr. (U.S. Pat. No. 730,344) illustrated one example of a tank with internal bracing 22 and 23. Prior alternate configurations include thick concrete walls.

It is advantageous to reduce the thickness of the walls in order to reduce cost and reduce weight.

It is also advantageous to reduce the construction time required to construct and bring the process online.

Accordingly, it would be desirable to provide a waste water tank with multiple chambers, the walls of which are supported by cables in order to minimize the thickness of the walls and eliminate internal metal bracing therefore need not be thick and need not utilize internal metal bracing.

SUMMARY OF THE INVENTION

In general, in a first aspect, the present invention relates to a waste water tank comprising an inner tank with an inner tank wall; a concentric outer tank with an outer tank wall; a plurality of radially extending inner walls extending from the outer tank wall to the inner tank wall, such that the plurality of inner walls divides the outer tank into a plurality of chambers; and a plurality of cables attached to and extending between adjacent pairs of the inner walls, such that the cables provide support to the inner walls when the chamber defined by the inner walls, the inner tank wall, and the outer tank wall is full of fluid and adjacent chambers are empty. The waste water tank may further comprise a plurality of cables attached to and extending between the inner tank wall and the outer tank wall. The waste water tank may further comprise a plurality of turnbuckles connecting the plurality of cables to the inner walls and to the inner tank wall and the outer tank wall, if there are cables spanning those walls.

The waste water tank may further comprise a plurality of support angles, each with a plurality of holes, attached to the inner walls, such that the plurality of turnbuckles may be attached to the inner walls via the plurality of holes. Each of the inner walls may have a first side and a second side, and a plurality of support angles may be attached to each first side of each inner wall and a plurality of support angles may be attached to each second side of each inner wall, where the plurality of support angles attached to the first sides are oriented vertically and the plurality of support angles attached to the second sides are oriented horizontally.

The vertically-oriented support angles and the horizontally-oriented support angles may each comprise a first leg, where the first leg is parallel to and attached to the inner wall, and a second leg oriented perpendicular to the first leg, where the plurality of holes to which the plurality of turnbuckles may attach are located on the second leg. The first legs of the vertically-oriented support angles and the horizontally-oriented support angles may have a plurality of holes spaced such that each hole in each first leg of each vertically-oriented support angle located on each first side of each inner wall aligns with one of the holes in one of the first legs of one of the horizontally-oriented support angles located on the second side of the same inner wall, and each hole in each first leg of each horizontally-oriented support angle located on each second side of each inner wall aligns with one of the holes in one of the first legs of one of the vertically-oriented support angles located on the first side of the same inner wall. There may be a plurality of bolts attaching the vertically-oriented support angles and the horizontally-oriented support angles to the inner walls, where each of the bolts extends through one of the holes in one of the first legs of one of the vertically-oriented support angles located on the first side of one of the inner walls, through the inner wall, and through the corresponding hole in one of the first legs of one of the horizontally-oriented support angles located on the second side of the inner wall.

The waste water tank may further comprise a plurality of plates connected to the horizontally-oriented support angles and containing a plurality of holes, to which the plurality of turnbuckles may attach. There may be a plurality of bolts connecting the plurality of plates to the horizontally-oriented support angles.

The waste water tank may further comprise a plurality of vertically-oriented support angles, each with a plurality of holes, attached to the inner tank wall and to the outer tank wall, such that the plurality of turnbuckles may be attached to the inner tank wall and the outer tank wall via the plurality of holes, if there are cables spanning the inner tank and outer tank walls.

Alternately, the waste water tank may comprise an inner tank with an inner tank wall; a concentric outer tank with an outer tank wall and a tank floor; a plurality of inner walls extending from said outer tank wall to said inner tank wall, such that the plurality of inner walls divides the outer tank into a plurality of chambers; a plurality of cable dead man anchors attached to the tank floor; and a plurality of cables attached to the inner walls and each extending from one of the inner walls to either one of the cable dead man anchors located adjacent the inner wall or another of the inner walls located adjacent the inner wall, such that the cables provide support to the inner wall when a chamber defined by the inner wall, another of the inner walls located adjacent the first inner wall, the inner tank wall, and the outer tank wall is full of fluid and adjacent chambers are empty. The options that apply to the first embodiment apply as well to the second embodiment.

Other advantages and features will be apparent from the following description and from the claims.

DETAILED DESCRIPTION OF THE PREFERRED EMBODIMENTS

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
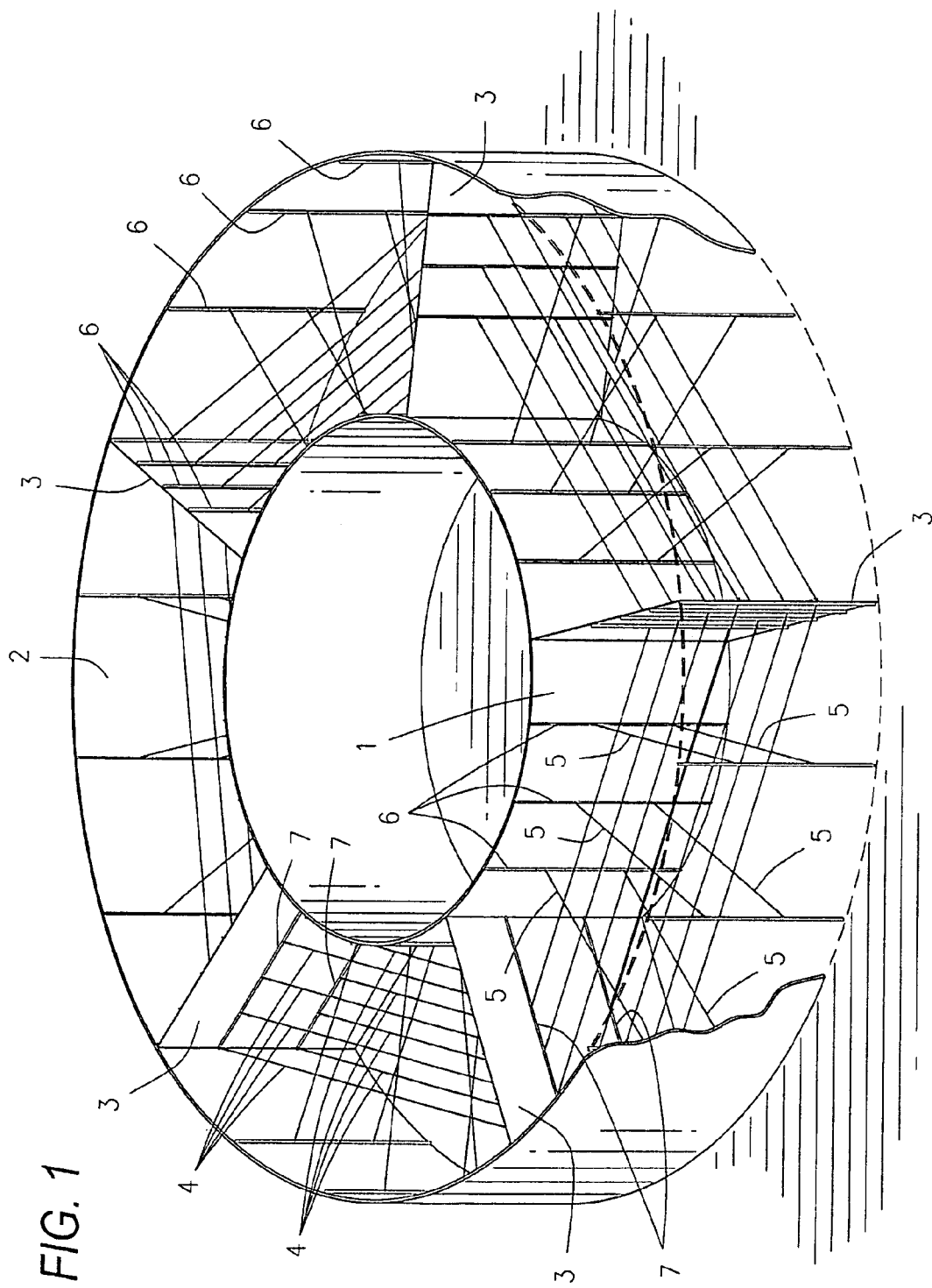
FIG. 1 is a perspective view of an initial preferred embodiment of a cable supported multi-chamber waste water tank.
Figure 2:
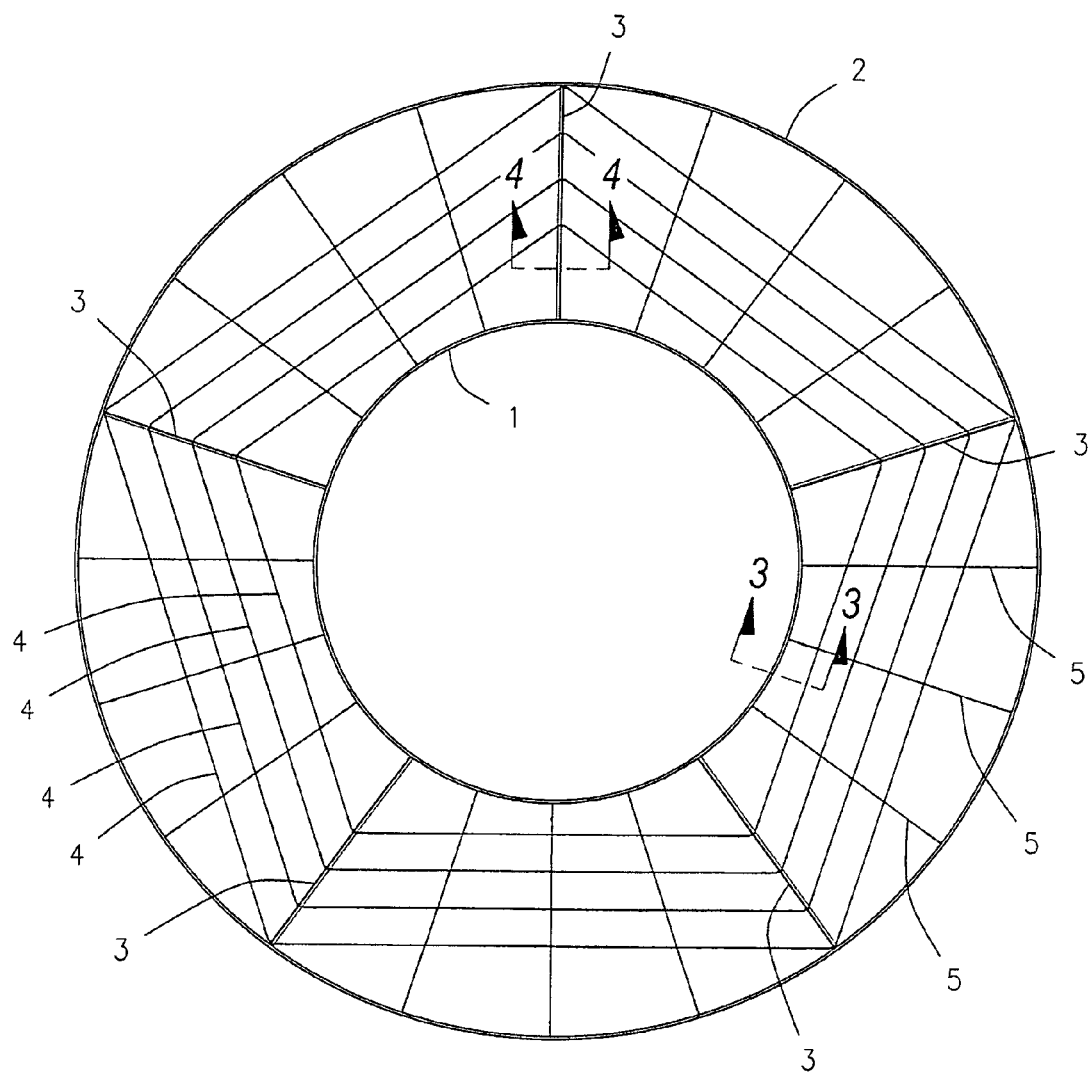
FIG. 2 is an overhead view of the tank shown in FIG. 1.

Referring to the figures of the drawings, wherein like numerals of reference designate like elements throughout the several views, FIGS. 1 and 2 show a cable supported multi-chamber waste water tank with an inner tank having a cylindrical inner tank wall 1 and a concentric outer tank having a cylindrical outer tank wall 2. A plurality of inner walls 3 extend from the outer tank wall 1 to the inner tank wall 2. The inner walls 3 divide the outer tank into a plurality of chambers.

A plurality of cables 4 attach to and extend between adjacent pairs of inner walls 3. The cables 4 may be organized in rows and columns. For example, one face of an inner wall 3 may have five evenly spaced rows of cables 4, with five evenly spaced cables 4 in each row, such that there are twenty-five cables 4 attached to that face of an inner wall 3 in a grid pattern. Alternately, the cables 4 need not be evenly spaced. Any number of cables 4 may be attached to a given inner wall 3, including zero cables 4.

The plurality of cables 4 attached to and extending between the adjacent pairs of inner walls 3 offer support to the inner walls 3. This allows a chamber defined by a pair of inner walls 3, the inner tank wall 1, and the outer tank wall 2 to be filled with waste water while adjacent chambers remain empty or near empty. The pressure on the inner walls 3 caused by the waste water in the chamber is offset by the tension provided by the cables 4 on the inner walls 3.

Optionally, a plurality of cables 5 may also attach to and extend between the inner tank wall 1 and the outer tank wall 2. This provides support to the inner tank wall 1 and the outer tank wall 2, such that the walls 1 and 2 are supported by the cables 5 when a chamber of the outer tank is filled with waste water and the walls 1 and 2 are thus subjected to pressure created by the waste water.

Figure 3:
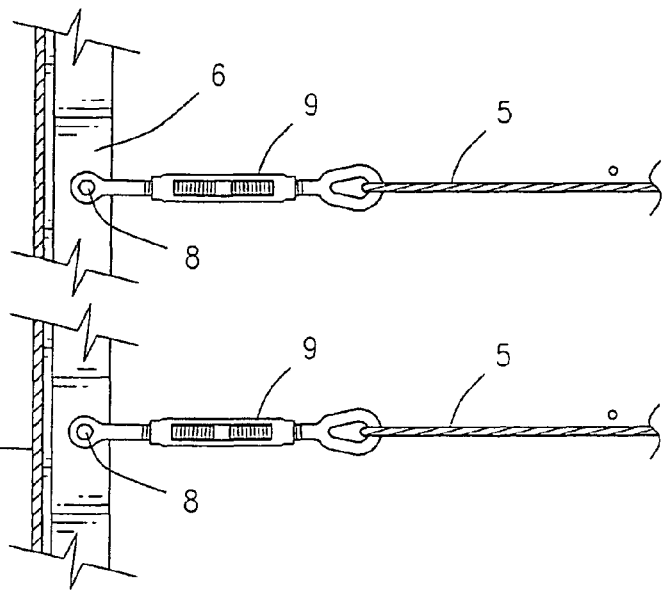
FIG. 3 is a cross-section cut-away view of the inner tank wall, showing how cables are attached to the inner tank wall taken along section line 3-3 of FIG. 2.

The cables 4 and 5 may be attached to the walls 1, 2, and 3 via vertically-oriented support angles 6 and horizontally-oriented support angles 7. If the cable supported multi-chamber waste water tank has a plurality of cables 5 extending between the inner tank wall 1 and the outer tank wall 2, a plurality of vertically-oriented support angles 6 may attach to the outside of inner tank wall 1, as seen in FIG. 3, and the inside of outer tank wall 2. Each of the vertically-oriented support angles 6 may have a plurality of holes in the leg of the support angle 6 that is perpendicular to the leg of the support angle 6 that attaches to the wall 1 or 2. The cables 5 may attach to the support angle 6 via these holes, such as by bolts 8 and turnbuckles 9.

Similarly, a plurality of vertically-oriented support angles 6 and horizontally-oriented support angles 7 may attach to the inner walls 3. Each inner wall 3 has a first side and a second side. A plurality of vertically-oriented support angles 6 may be attached to the first side of each inner wall 3, while a plurality of horizontally-oriented support angles 7 may be attached to the second side of each inner wall 3. The leg of each support angle 6 or 7 that lies flush with the wall 3 may have a plurality of holes, such that each such hole in a vertically-oriented support angle 6 on the first side of an inner wall 3 lines up with one such hole in a horizontally-oriented support angle 7 on the second side of the inner wall 3. Thus, both the vertically-oriented support angle 6 and the corresponding horizontally-oriented support angle 7 may be attached to the inner wall 3 by placing one of a plurality of bolts 10 through the hole in the vertically-oriented support angle 6, through the inner wall 3, and through the corresponding hole in the horizontally-oriented support angle 7. By organizing the support angles 6 and 7 in this manner, a single vertically-oriented support angle 6 may be connected through an inner wall 3 to multiple horizontally-oriented support angles 7, and a single horizontally-oriented support angle 7 may likewise be connected through the inner wall 3 to multiple vertically-oriented support angles 6. A plurality of support angles 6 and 7 attached to an inner wall 3 may thus form a grid pattern, which provides increased strength to the structure.

Figure 4:
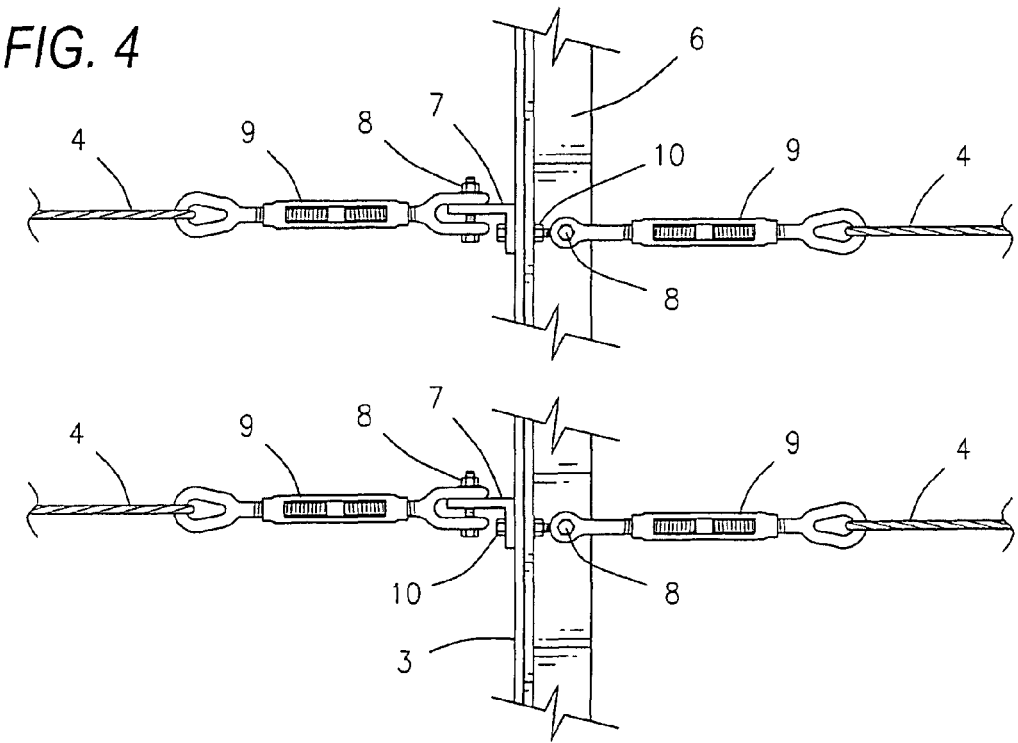
FIG. 4 is a cross-section cut-away view of one of the inner walls, showing how cables are attached to the inner walls taken along section line 4-4 of FIG. 2.

As with the support angles 6 attached to the inner tank wall 1 and outer tank wall 2, each of the support angles 6 and 7 attached to the inner walls 3 may have a plurality of holes in the leg of the support angle 6 or 7 that is perpendicular to the leg of the support angle 6 or 7 that attaches to the inner wall 3. The cables 4 may attach to the support angle 6 or 7 via these holes, such as by bolts 8 and turnbuckles 9, as seen in FIG. 4.

The horizontally-oriented support angles 7 may not connect directly to the turnbuckles 9, Rather, a plate may be attached to the perpendicularly projecting leg of the horizontally-oriented support angle 7, and the turnbuckles 9 may attach to the plate. Such attachments may be via bolts 8.

The cable supported multi-chamber waste water tank may be any suitable size or material. By way of example only, and in no way by means of limitation, the typical diameter of the outer tank may be 70 feet plus or minus 50%. The typical diameter of the inner tank may be 35 feet plus or minus 50%. The typical height of the tank may be 17 feet plus or minus 30%. The cables 4 and 5 may be spaced 10 feet apart. The support angles 6 and 7 may measure 3 inches by 4 inches by ¼ inch, and the plate that may be attached to the horizontally-oriented support angles 7 may be ¼ inch stainless steel plate. The cables 4 and 5 may be stainless steel cable, and the turnbuckles 9 may be stainless steel jaw and eye turnbuckles.

Figure 5:
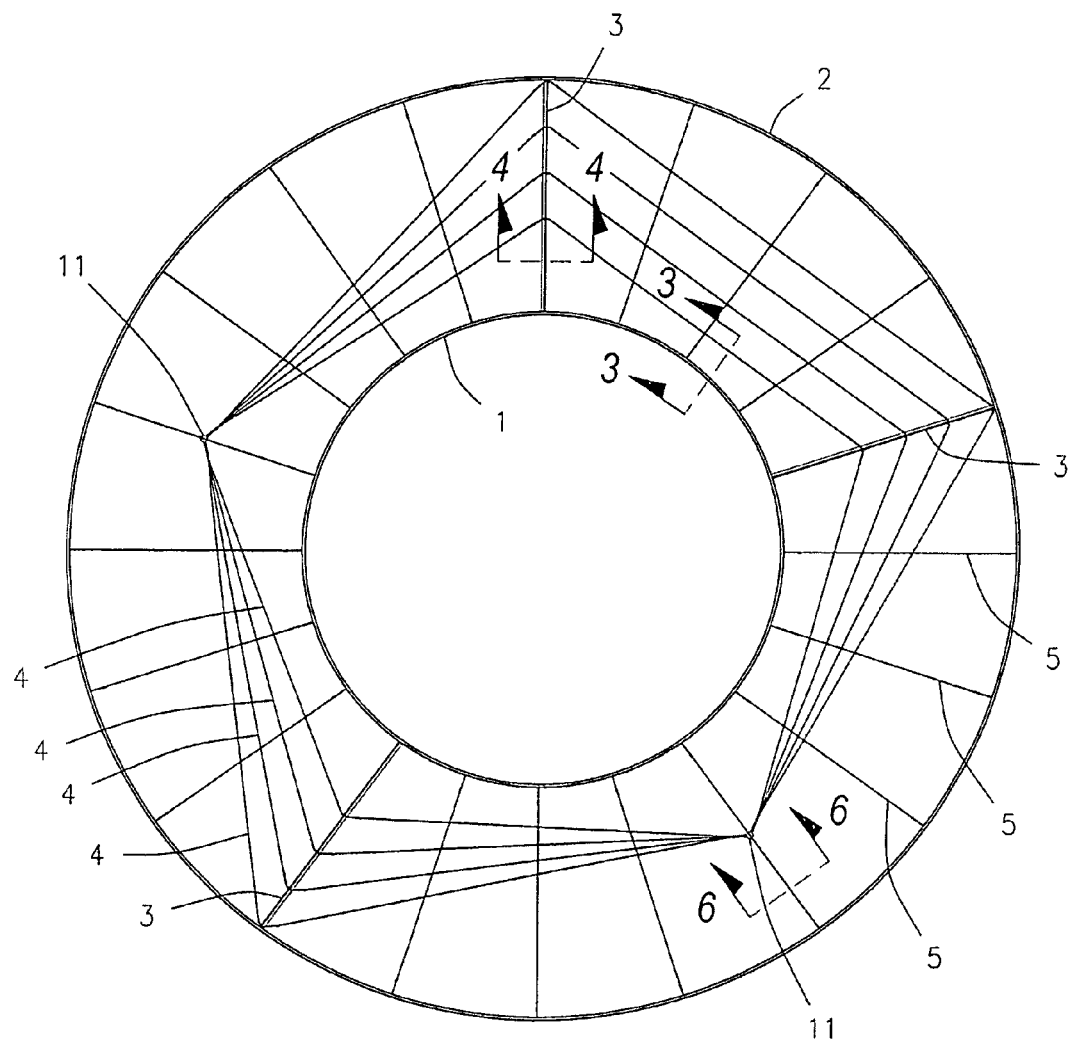
FIG. 5 is an overhead view an alternate preferred embodiment of a cable supported multi-chamber waste water tank utilizing fewer inner walls and cable dead man anchors.
Figure 6:
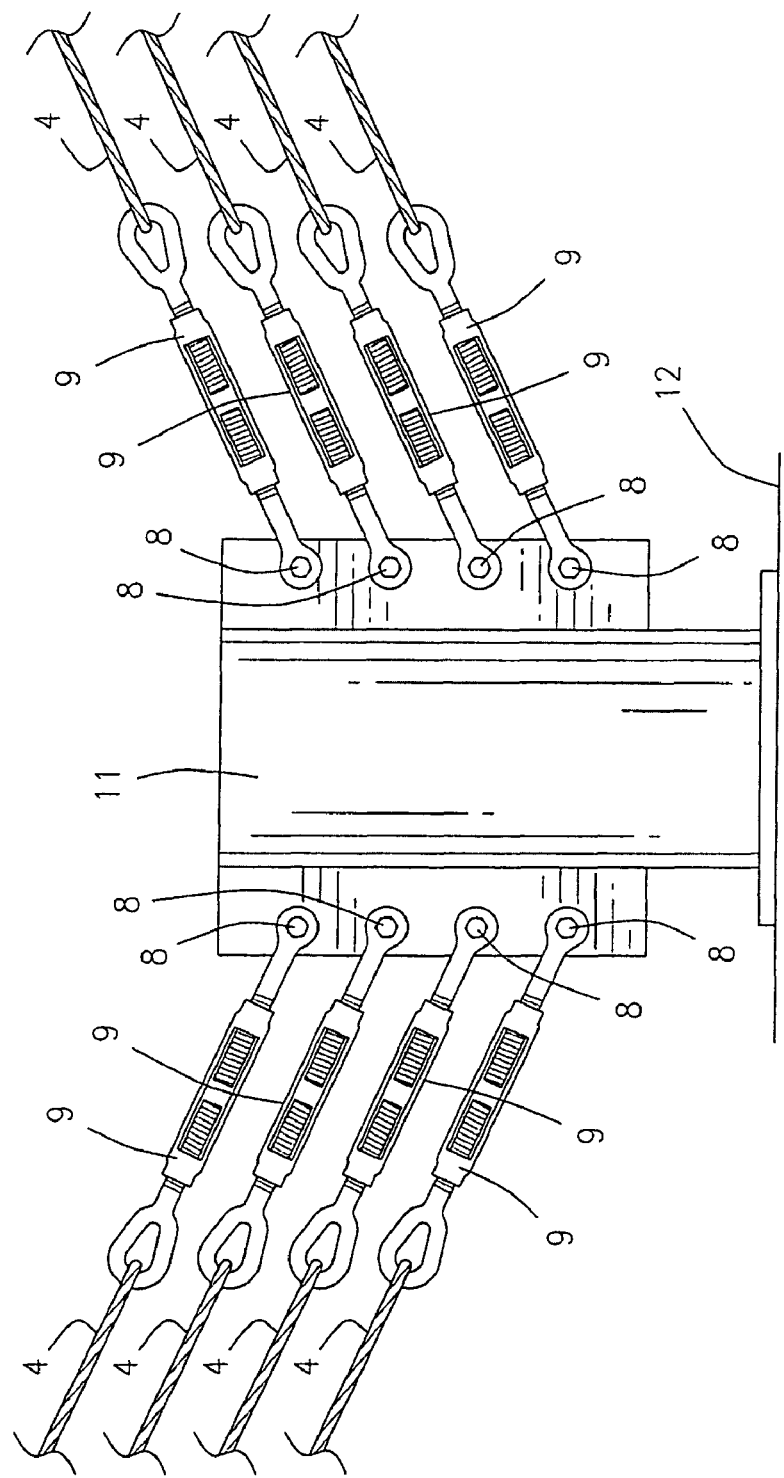
FIG. 6 is a cross-section view of one of the cable dead man anchors taken along section line 6-6 of FIG. 5.

In an alternate embodiment of the cable-supported multi-chamber waste water tank, as seen in FIG. 5, some of the inner walls 3 may be spaced sufficiently distant from one another that cables 4 cannot stretch directly between the inner walls 3, as the inner tank wall 1 would be in the way. Therefore, in these chambers, a cable dead man anchor 11 may be attached to the tank floor 12, and the cables 4 may be attached on one end to an inner wall 3 and on the other end to the cable dead man anchor 11, as seen in FIG. 6. The cable dead man anchor 11 may be attached to the tank floor 12 roughly halfway in between the two adjacent inner walls 3 to which it will be connected via cables 4, and may be attached to the tank floor 12 roughly halfway between the inner wall 1 and the outer wall 2. The cables 4 may be attached to the cable dead man anchor 11 via bolts 8 and turnbuckles 9.

Whereas, the devices and methods have been described in relation to the drawings and claims, it should be understood that other and further modifications, apart from those shown or suggested herein, may be made within the spirit and scope of this invention.

What is claimed is:

1. A waste water tank, comprising:
   A cylindrical inner tank with an inner tank wall;
   a concentric cylindrical outer tank with an outer tank wall;
   a plurality of radially arranged inner walls extending from said outer tank wall to said inner tank wall, such that said plurality of inner walls divides said outer tank into a plurality of chambers; and
   a plurality of cables attached to and extending between adjacent pairs of said inner walls, such that said cables provide support to said inner walls when the chamber defined by said inner walls, said inner tank wall, and said outer tank wall is full of fluid and adjacent chambers are empty.

2. The waste water tank of claim 1 further comprising a plurality of cables attached to and extending between said inner tank wall and said outer tank wall.

3. The waste water tank of claim 1 further comprising a plurality of turnbuckles connecting said plurality of cables to said inner walls.

4. The waste water tank of claim 2 further comprising a plurality of turnbuckles connecting said plurality of cables to said inner walls and to said inner tank wall and said outer tank wall.

5. The waste water tank of claim 3 further comprising a plurality of support angles, each with a plurality of holes, attached to said inner walls, such that said plurality of turnbuckles may be attached to said inner walls via said plurality of holes.

6. The waste water tank of claim 5 where each of said inner walls has a first side and a second side, and where a plurality of said support angles is attached to each said first side of each said inner wall and a plurality of said support angles is attached to each said second side of each said inner wall, where the plurality of support angles attached to said first sides are oriented vertically and the plurality of support angles attached to said second sides are oriented horizontally.

7. The waste water tank of claim 6 where the vertically-oriented support angles and the horizontally-oriented support angles each comprise:
   a first leg, where said first leg is parallel to and attached to said inner wall; and
   a second leg oriented perpendicular to said first leg, where said plurality of holes to which said plurality of turnbuckles may attach are located on said second leg.

8. The waste water tank of claim 7 where the first legs of the vertically-oriented support angles and the horizontally-oriented support angles have a plurality of holes spaced such that each hole in each first leg of each vertically-oriented support angle located on each first side of each inner wall aligns with one of the holes in one of the first legs of one of the horizontally-oriented support angles located on the second side of the same inner wall, and each hole in each first leg of each horizontally-oriented support angle located on each second side of each inner wall aligns with one of the holes in one of the first legs of one of the vertically-oriented support angles located on the first side of the same inner wall.

9. The waste water tank of claim 8 further comprising a plurality of bolts attaching said vertically-oriented support angles and said horizontally-oriented support angles to said inner walls, where each of said bolts extends through one of said holes in one of said first legs of one of said vertically-oriented support angles located on the first side of one of said inner walls, through said inner wall, and through the corresponding hole in one of said first legs of one of said horizontally-oriented support angles located on the second side of said inner wall.

10. The waste water tank of claim 9 further comprising a plurality of plates connected to said horizontally-oriented support angles and containing a plurality of holes, to which said plurality of turnbuckles may attach.

11. The waste water tank of claim 10 further comprising a plurality of bolts connecting said plurality of plates to said horizontally-oriented support angles.

12. The waste water tank of claim 4 further comprising a plurality of vertically-oriented support angles, each with a plurality of holes, attached to said inner tank wall and to said outer tank wall, such that said plurality of turnbuckles may be attached to said inner tank wall and said outer tank wall via said plurality of holes.

13. A waste water tank comprising:
   a cylindrical inner tank with an inner tank wall;
   a concentric cylindrical outer tank with an outer tank wall and a tank floor;
   a plurality of radially arranged inner walls extending from said outer tank wall to said inner tank wall, such that said plurality of inner walls divides said outer tank into a plurality of chambers;
   a plurality of cable dead man anchors attached to said tank floor; and
   a plurality of cables attached to said inner walls and each extending from one of said inner walls to either one of said cable dead man anchors located adjacent said inner wall or another of said inner walls located adjacent said inner wall, such that said cables provide support to said inner wall when a chamber defined by said inner wall, another of said inner wall located adjacent said inner wall, said inner tank wall, and said outer tank wall is full of fluid and adjacent chambers are empty.

14. The waste water tank of claim 13 further comprising a plurality of cables attached to and extending between said inner tank wall and said outer tank wall.

15. The waste water tank of claim 13 further comprising a plurality of turnbuckles connecting said plurality of cables to said inner walls and to said dead man anchors.

16. The waste water tank of claim 14 further comprising a plurality of turnbuckles connecting said plurality of cables to said inner walls, to said dead man anchors, to said inner tank wall, and to said outer tank wall.

17. The waste water tank of claim 15 further comprising a plurality of support angles, each with a plurality of holes, attached to said inner walls, such that said plurality of turnbuckles may be attached to said inner walls via said plurality of holes.

18. The waste water tank of claim 17 where each of said inner walls has a first side and a second side, and where a plurality of said support angles is attached to each said first side of each said inner wall and a plurality of said support angles is attached to each said second side of each said inner wall, where the plurality of support angles attached to said first sides are oriented vertically and the plurality of support angles attached to said second sides are oriented horizontally.

19. The waste water tank of claim 18 where the vertically-oriented support angles and the horizontally-oriented support angles each comprise:
  a first leg, where said first leg is parallel to and attached to said inner wall; and
  a second leg oriented perpendicular to said first leg, where said plurality of holes to which said plurality of turnbuckles may attach are located on said second leg.

20. The waste water tank of claim 19 where the first legs of the vertically-oriented support angles and the horizontally-oriented support angles have a plurality of holes spaced such that each hole in each first leg of each vertically-oriented support angle located on each first side of each inner wall aligns with one of the holes in one of the first legs of one of the horizontally-oriented support angles located on the second side of the same inner wall, and each hole in each first leg of each horizontally-oriented support angle located on each second side of each inner wall aligns with one of the holes in one of the first legs of one of the vertically-oriented support angles located on the first side of the same inner wall.

21. The waste water tank of claim 20 further comprising a plurality of bolts attaching said vertically-oriented support angles and said horizontally-oriented support angles to said inner walls, where each of said bolts extends through one of said holes in one of said first legs of one of said vertically-oriented support angles located on the first side of one of said inner walls, through said inner wall, and through the corresponding hole in one of said first legs of one of said horizontally-oriented support angles located on the second side of said inner wall.

22. The waste water tank of claim 21 further comprising a plurality of plates connected to said horizontally-oriented support angles and containing a plurality of holes, to which said plurality of turnbuckles may attach.

23. The waste water tank of claim 22 further comprising a plurality of bolts connecting said plurality of plates to said horizontally-oriented support angles.

24. The waste water tank of claim 16 further comprising a plurality of vertically-oriented support angles, each with a plurality of holes, attached to said inner tank wall and to said outer tank wall, such that said plurality of turnbuckles may be attached to said inner tank wall and said outer tank wall via said plurality of holes.

* * * * *